(12) United States Patent
Neuman

(10) Patent No.: US 7,069,391 B1
(45) Date of Patent: Jun. 27, 2006

(54) METHOD FOR IMPROVED FIRST LEVEL CACHE COHERENCY

(75) Inventor: Paul S. Neuman, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 463 days.

(21) Appl. No.: 09/650,800

(22) Filed: Aug. 30, 2000

(51) Int. Cl.
*G06F 12/00* (2006.01)

(52) U.S. Cl. .................... 711/141; 711/122; 711/146

(58) Field of Classification Search ............... 711/117, 711/122, 124, 141, 144, 146; 714/6, 703
See application file for complete search history.

(56) References Cited

U.S. PATENT DOCUMENTS

| | | | | |
|---|---|---|---|---|
| 4,056,844 A | 11/1977 | Izumi | | 364/200 |
| 4,349,871 A | 9/1982 | Lary | | 364/200 |
| 4,442,487 A | 4/1984 | Fletcher et al. | | 364/200 |
| 4,525,777 A | 6/1985 | Webster et al. | | 364/200 |
| 4,755,930 A | 7/1988 | Wilson, Jr. et al. | | 364/200 |
| 4,794,521 A | 12/1988 | Ziegler et al. | | 364/200 |
| 4,807,110 A | 2/1989 | Pomerene et al. | | 364/200 |
| 4,843,542 A | 6/1989 | Dashiell et al. | | 364/200 |
| 4,860,192 A | 8/1989 | Sachs et al. | | 364/200 |
| 4,891,809 A | * 1/1990 | Hazawa | | 714/703 |
| 5,023,776 A | 6/1991 | Gregor | | 364/200 |
| 5,025,365 A | 6/1991 | Mathur et al. | | 364/200 |
| 5,025,366 A | 6/1991 | Baror | | 364/200 |
| 5,283,876 A | * 2/1994 | Tague | | 711/207 |
| 5,564,035 A | * 10/1996 | Lai | | 711/144 |
| 5,627,993 A | * 5/1997 | Abato et al. | | 711/143 |
| 5,778,433 A | * 7/1998 | Collins et al. | | 711/135 |
| 6,021,468 A | * 2/2000 | Arimilli et al. | | 711/122 |
| 6,061,766 A | * 5/2000 | Lynch et al. | | 711/146 |
| 6,115,791 A | * 9/2000 | Collins et al. | | 711/122 |
| 6,128,711 A | * 10/2000 | Duncan et al. | | 711/155 |
| 6,253,291 B1 | * 6/2001 | Pong et al. | | 711/146 |
| 6,397,300 B1 | * 5/2002 | Arimilli et al. | | 711/138 |
| 6,425,060 B1 | * 7/2002 | Mounes-Toussi et al. | | 711/158 |
| 6,446,167 B1 | * 9/2002 | Mayfield et al. | | 711/122 |

* cited by examiner

*Primary Examiner*—Pierre M. Vital
(74) *Attorney, Agent, or Firm*—Charles A. Johnson; Mark T. Starr; Nawrocki, Rooney & Sivertson, PA

(57) ABSTRACT

A method of and apparatus for improving the efficiency of a data processing system employing a multiple level cache memory system. The efficiencies result from invalidating level one cache information based upon a level one cache memory write. Similarly, the invalidation can occur from system bus SNOOPs. In addition, level one and level two cache memory misses result in loading and recording of the requested data into both level one and level two cache memories. Furthermore, a level two cache memory parity error results in invalidation of the corresponding level one cache memory data.

20 Claims, 4 Drawing Sheets

METHOD FOR IMPROVED FIRST LEVEL CACHE COHERENCY

CROSS REFERENCE TO CO-PENDING APPLICATIONS

The present application is related to co-pending U.S. patent application Ser. No. 09/626,030, filed Jul. 27, 2000, entitled Cooperative Hardware and Microcode Control System for Pipelined Instruction Execution; U.S. patent application Ser. No. 09/651,597, filed Aug. 30, 2000, entitled Method for Avoiding Delays During SNOOP Requests; U.S. patent application Ser. No. 09/650,730, filed Aug. 30, 2000, entitled Leaky Cache Mechanism; and U.S. patent application Ser. No. 08/235,196, filed Apr. 24, 1994, entitled Data Coherency Protocol for Multi-level Cached High Performance Multiprocessor System, assigned to the assignee of the present invention and incorporated herein by reference.

BACKGROUND OF THE INVENTION

1. Field of the Invention

The present invention relates generally to data processing systems employing multiple instruction processors and more particularly relates to multiprocessor data processing systems employing multiple levels of cache memory.

2. Description of the Prior Art

It is known in the art that the use of multiple instruction processors operating out of common memory can produce problems associated with the processing of obsolete memory data by a first processor after that memory data has been updated by a second processor. The first attempts at solving this problem tended to use logic to lock processors out of memory spaces being updated. Though this is appropriate for rudimentary applications, as systems become more complex, the additional hardware and/or operating time required for the setting and releasing of locks can not be justified, except for security purposes. Furthermore, reliance on such locks directly prohibits certain types of applications such as parallel processing.

The use of hierarchical memory systems tends to further compound the problem of data obsolescence. U.S. Pat. No. 4,056,844 issued to Izumi shows a rather early approach to a solution. The system of Izumi utilizes a buffer memory dedicated to each of the processors in the system. Each processor accesses a buffer address array to determine if a particular data element is present in its buffer memory. An additional bit is added to the buffer address array to indicate invalidity of the corresponding data stored in the buffer memory. A set invalidity bit indicates that the main storage has been altered at that location since loading of the buffer memory. The validity bits are set in accordance with the memory store cycle of each processor.

U.S. Pat. No. 4,349,871 issued to Lary describes a bussed architecture having multiple processing elements, each having a dedicated cache memory. According to the Lary design, each processing unit manages its own cache by monitoring the memory bus. Any invalidation of locally stored data is tagged to prevent use of obsolete data. The overhead associated with this approach is partially mitigated by the use of special purpose hardware and through interleaving the validity determination with memory accesses within the pipeline. Interleaving of invalidity determination is also employed in U.S. Pat. No. 4,525,777 issued to Webster et al.

Similar bussed approaches are shown in U.S. Pat. No. 4,843,542 issued to Dashiell et al, and in U.S. Pat. No. 4,755,930 issued to Wilson, Jr. et al. In employing each of these techniques, the individual processor has primary responsibility for monitoring the memory bus to maintain currency of its own cache data. U.S. Pat. No. 4,860,192 issued to Sachs et al, also employs a bussed architecture but partitions the local cache memory into instruction and operand modules.

U.S. Pat. No. 5,025,365 issued to Mathur et al, provides a much enhanced architecture for the basic bussed approach. In Mathur et al, as with the other bussed systems, each processing element has a dedicated cache resource. Similarly, the cache resource is responsible for monitoring the system bus for any collateral memory accesses which would invalidate local data. Mathur et al, provide a special snooping protocol which improves system throughput by updating local directories at times not necessarily coincident with cache accesses. Coherency is assured by the timing and protocol of the bus in conjunction with timing of the operation of the processing element.

An approach to the design of an integrated cache chip is shown in U.S. Pat. No. 5,025,366 issued to Baror. This device provides the cache memory and the control circuitry in a single package. The technique lends itself primarily to bussed architectures. U.S. Pat. No. 4,794,521 issued to Ziegler et al, shows a similar approach on a larger scale. The Ziegler et al, design permits an individual cache to interleave requests from multiple processors. This design resolves the data obsolescence issue by not dedicating cache memory to individual processors. Unfortunately, this provides a performance penalty in many applications because it tends to produce queuing of requests at a given cache module.

The use of a hierarchical memory system in a multiprocessor environment is also shown in U.S. Pat. No. 4,442,487 issued to Fletcher et al. In this approach, each processor has dedicated and shared caches at both the L1 or level closest to the processor and at the L2 or intermediate level. Memory is managed by permitting more than one processor to operate upon a single data block only when that data block is placed in shared cache. Data blocks in dedicated or private cache are essentially locked out until placed within a shared memory element. System level memory management is accomplished by a storage control element through which all requests to shared main memory (i.e. L3 level) are routed. An apparent improvement to this approach is shown in U.S. Pat. No. 4,807,110 issued to Pomerene et al. This improvement provides prefetching of data through the use of a shadow directory.

A further improvement to Fletcher et al, is seen in U.S. Pat. No. 5,023,776 issued to Gregor. In this system, performance can be enhanced through the use of store around L1 caches used along with special write buffers at the L2 intermediate level. This approach appears to require substantial additional hardware and entails yet more functions for the system storage controller.

SUMMARY OF THE INVENTION

The present invention overcomes the problems found in the prior art by providing a method and apparatus for improving the efficiency of maintaining coherency of a first level cache memory within a system having multiple levels of cache memory. This enhancement to efficiency is accomplished by utilizing a validation cycle, invalidation cycle, and parity detection circuitry, as discussed below.

The preferred mode of the present invention includes up to four main memory storage units. Each is coupled directly to each of up to four "pod"s. Each pod contains a level three cache memory coupled to each of the main memory storage units. Each pod may also accommodate up to two input/output modules.

Each pod may contain up to two sub-pods, wherein each sub-pod may contain up to two instruction processors. Each instruction processor has two separate level one cache memories (one for instructions and one for operands) coupled through a dedicated system controller, having a second level cache memory, to the level three cache memory of the pod.

Unlike many prior art systems, both level one and level two cache memories are dedicated to an instruction processor within the preferred mode of the present invention. The level one cache memories are of two types. Each instruction processor has an instruction cache memory and an operand cache memory. The instruction cache memory is a read-only cache memory primarily having sequential access. The level one operand cache memory has read/write capability. In the read mode, it functions much as the level one instruction cache memory. In the write mode, it is a semi-store-in cache memory, because the level two cache memory is also dedicated to the instruction processor.

In accordance with the present invention, level one cache memory data is invalidated during the invalidate cycle under three conditions. In the third mode, a write hit causes invalidation as a result of declared ownership of the data. In the first or second modes, write hits or system bus snoop hits result in invalidation of the corresponding level one data.

When read data is made available, the system controller maintains a record of the location of the data within the level one cache memory.

Finally, a parity error within the system controller level two cache memory causes invalidation of the level one cache memory data. This is done as a precaution against loss of coherency control.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
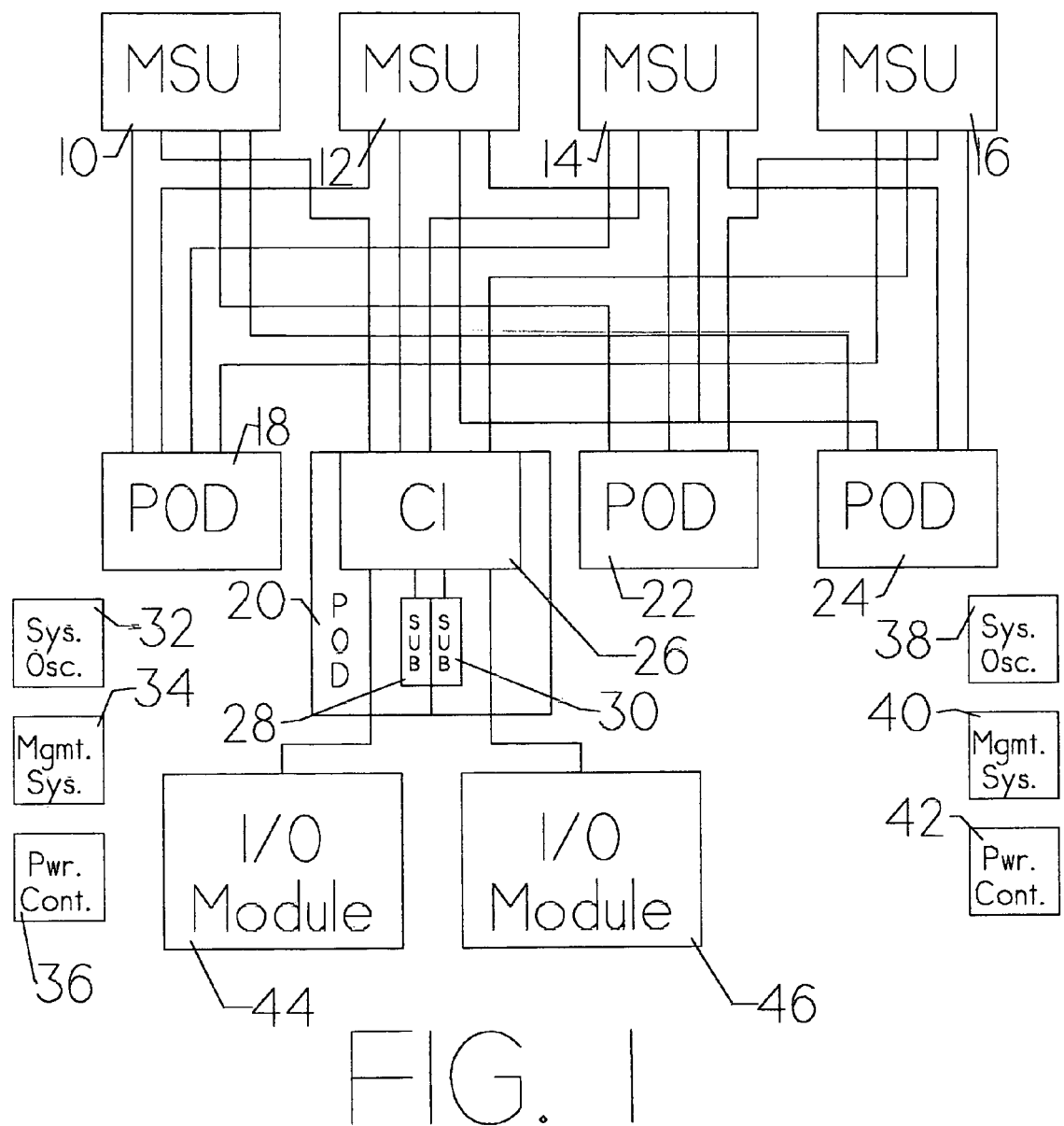
FIG. 1 is an overall block diagram of a fully populated system in accordance with the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
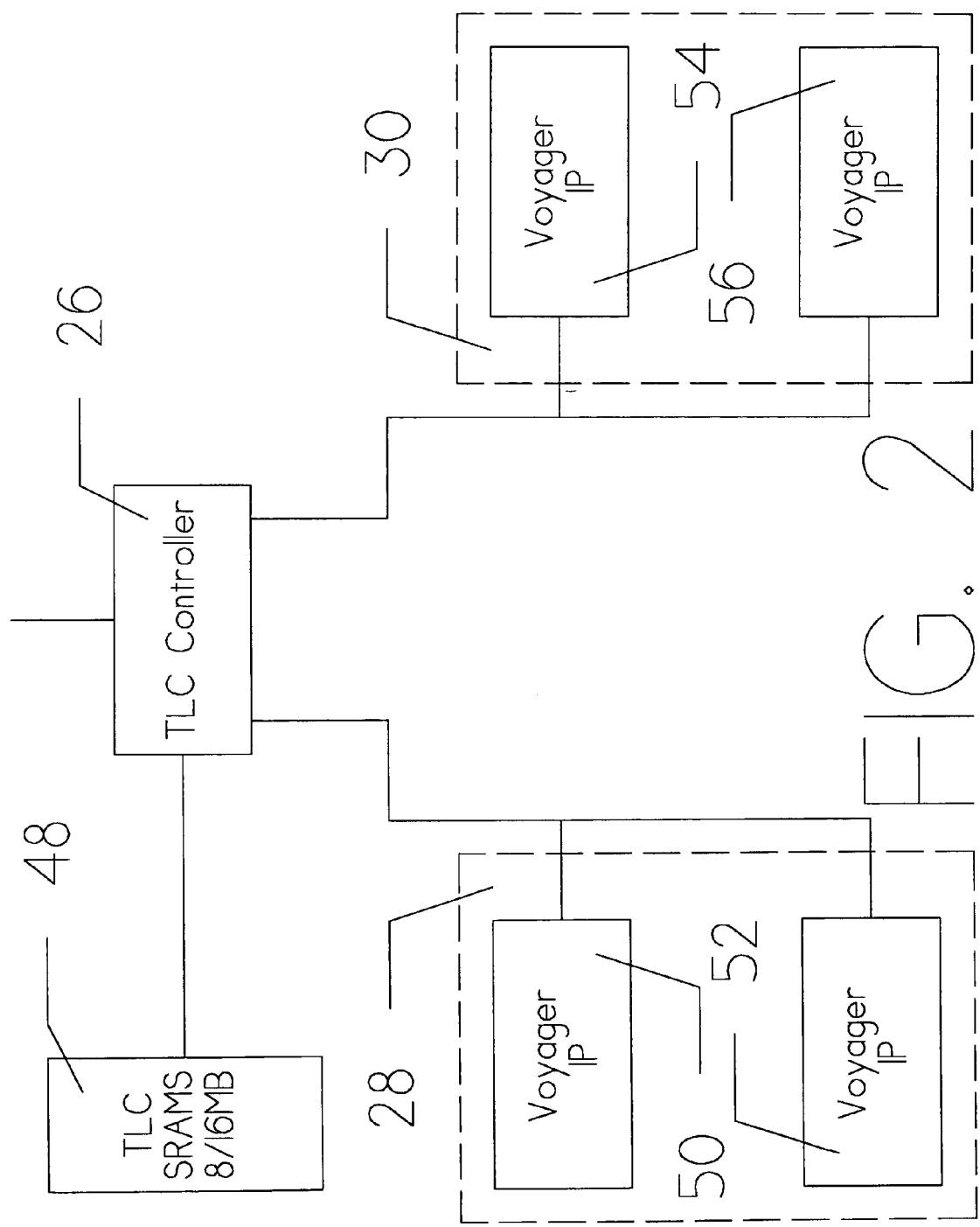
FIG. 2 is a schematic block diagram of one pod.

FIG. 2 is a more detailed block diagram of POD 20. The level three cache memory interfaces directly with the memory storage units via TLC (Third Level Cache) Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
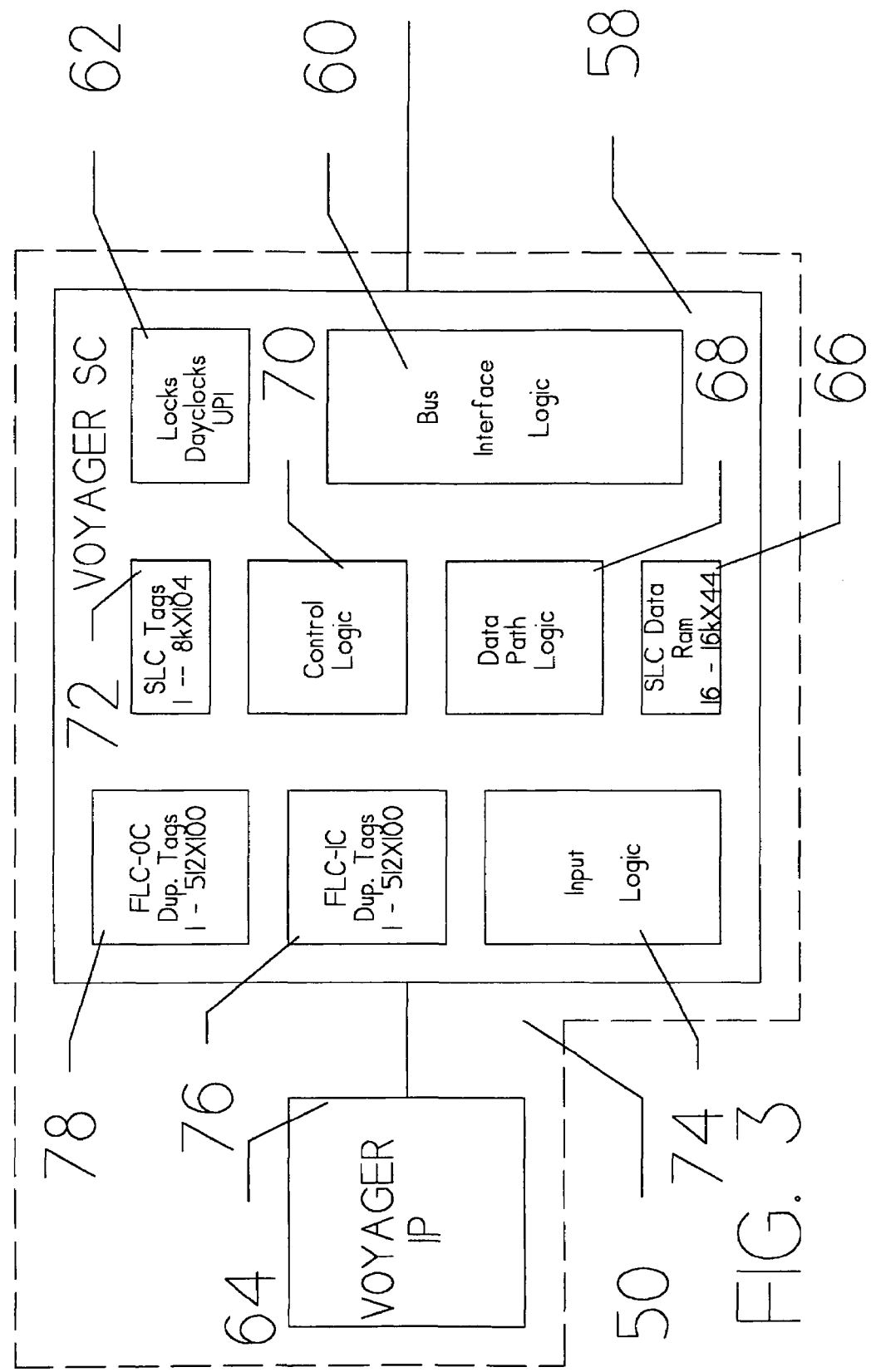
FIG. 3 is a schematic block diagram of one instruction processor along with its dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58. The utilitarian functions are provided by Locks, Dayclocks, and UPI (Uninterruptible Power Interface) 62.

The remaining elements of system controller 58 provide the level two cache memory functions. SLC (Second Level Cache) data RAM 66 is the data actual storage facility. Control logic 70 provides the cache management function. SLC tags 72 are the tags associated with the level two cache memory. FLC-IC (First Level Cache-Instruction Cache)

Dup. Tags 76 provides the duplicate tags for the level one instruction cache memory of instruction processor 64. Similarly, FLC-OC (First Level Cache-Operand Cache) Dup. Tags 78 provides the duplicate tags for the level one operand cache memory of instruction processor 64. For a more complete discussion of this duplicate tag approach, reference may be made with the above identified co-pending and incorporated U.S. Patent Applications.

Figure 4:
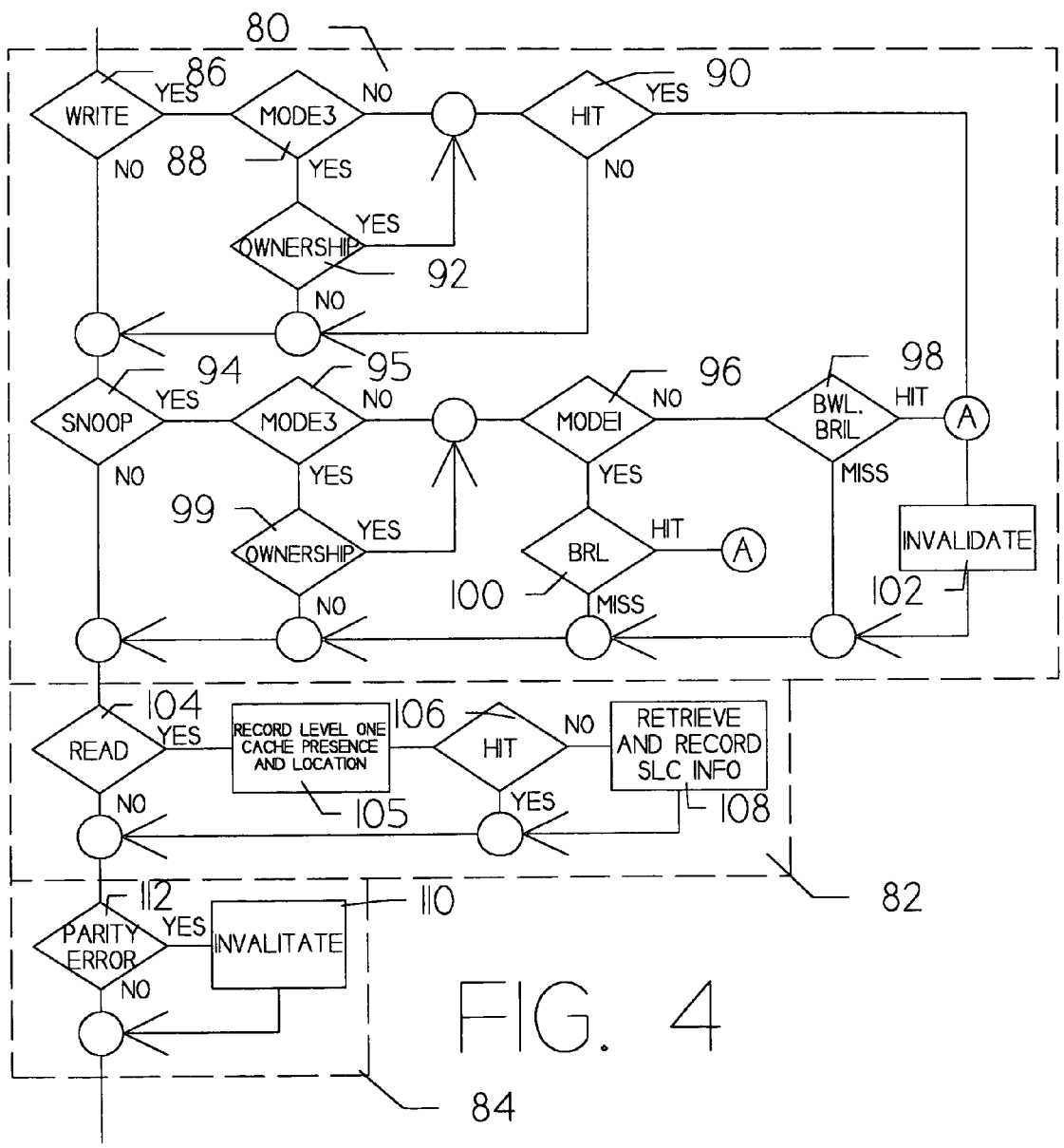
FIG. 4 is a detailed flow chart of the operation of the present invention.

FIG. 4 is a detailed flow chart of the operation of the present invention showing three specific opportunities to improve efficiency of the multi-level cache memory system. Process 80 provides for invalidation of level one cache memory contents based upon conditions during the invalidate cycle. Process 82 is an enhancement based upon the validation cycle. Process 84 provides invalidation upon a parity error.

Process 80 is performed as a result of an instruction processor write request (i.e., an operand write) or memory bus SNOOP (i.e., monitoring of memory busses involving other instruction processors and other system controllers). For either of these activities, the corresponding data within the level one operand cache memory is invalidated under the shown circumstances. This invalidation during the invalidation cycle provides a time saving over a subsequent potential future request for the invalidated data.

Element 86 determines whether a write request has been made of the system controller (see also FIG. 3). Again, this request means that the instruction processor has attempted an operand write. If yes, element 88 determines whether this is a mode 3. If yes, element 92 requires ownership of the data within the level one operand cache memory or control is returned to element 94 without action. Note that a mode 3 write without ownership means that there is no data within the level one operand cache memory to invalidate. Therefore, further activity within process 80 would be wasted.

However, if element 92 determines that ownership is present, control is given to element 90 which determines whether there is a level one cache memory hit (i.e., operand write is to a data element present within the level one cache memory). If there is a hit, element 102 invalidates the contents of the corresponding location with the level one operand cache memory. However, if there is no hit, there can be no time saving, because a memory operation involving the level three cache memory is required.

The other condition for which process 80 is applicable is a system memory bus SNOOP. In this activity, the system controller monitors the system memory buses for activity from other processors and system controllers which might impact the validity of its local data. The above identified commonly assigned, co-pending, and incorporated patent applications discuss the SNOOP activity in greater detail.

The SNOOP activity is sensed by element 94. When present, after checking for Mode 3, control is given to element 96 to determine whether it is mode 1. Element 100 determines whether the SNOOP experiences a hit on the bus read line (BRL). If no, control is returned to element 104, because modes 2 and 3 are not concerned with the bus read line. Element 98 determines whether there is a hit on the bus write line (BWL) or bus read invalidate line (BRIL). If there is a hit, element 102 invalidates the corresponding location within the level one cache memory. This improves efficiency, because the data is invalidated without even being requested.

Read access is the concern of process 82. Element 104 determines when a read occurs. This is a result of an operand read operation within the instruction processor which experiences a level one operand cache memory miss. The request is made to the system controller wherein element 104 gives control to element 106. If there is also a miss within the level two cache memory, control is given to element 108 for retrieval of the requested data from the level three cache memory. After receiving the requested data, element 108 also loads the requested data into the level two cache memory and records its presence and location within the level one cache memory, thus making it potentially available for in response to a subsequent request.

The purpose of process 84 is an error recovery technique. Whenever element 112 determines that a parity error has been experienced with regard to the level two cache memory. When a parity error occurs, element 110 causes invalidation of the corresponding locations within the level one cache memory, to avoid loss of control between the instruction processor level one cache memories and the system controller level two cache memory.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. A data processing system comprising:
   a. a system bus;
   b. a processor with a system controller containing a semi-store-in level one cache memory having an associated duplicate tag memory responsively coupled to a dedicated level two cache memory having an associated tag memory which is responsively coupled via said system bus to a level three cache memory which is directly coupled to at least one memory storage unit;
   c. a circuit for directly SNOOPing said system bus; and
   d. First logic which invalidates a corresponding level one cache memory location in response to a non-local memory write request generated by another processor.

2. A data processing system according to claim 1 further comprising second logic which inhibits said first logic from invalidating said corresponding level one cache memory location in response to said non-local memory write request generated by another processor for mode 3 requests without ownership.

3. A data processing system according to claim 1 further comprising:
   a. Third logic which invalidates said corresponding level one cache memory location in response to a SNOOP hit.

4. A data processing system according to claim 3 further comprising:
   a. Fourth logic which records location of data within the level one cache memory in response to a level one cache memory read miss and a level two cache memory read miss.

5. A data processing system according to claim 4 further comprising:
   a. Fifth logic which detects a parity error in said level two cache memory and which in response invalidates said corresponding level one cache memory location to avoid loss of control between said level one cache memory and said level two cache memory.

6. A data processing system comprising:
   a. A processor having a level one cache memory within a system controller;
   b. A level two cache memory located within said system controller dedicated to said processor and responsively coupled to said level one cache memory;
   c. a system bus;

d. A memory storage unit;
e. A level three cache memory responsively coupled to said level two cache memory via said system bus and responsively coupled to said memory storage unit; and
f. A first circuit which invalidates a corresponding portion of said level one cache memory in response to a level one cache memory write hit and a level two cache memory hit.

7. A data processing system according to claim 6 further comprising:
   a. A second circuit which inhibits said first circuit from said invalidating in response to a mode 3 request with lack of ownership.

8. A data processing system according to claim 7 further comprising:
   a. A third circuit which SNOOPs said system memory bus; and
   b. A fourth circuit which invalidates said corresponding portion of said level one cache memory in response to a SNOOP hit from a write request by another processor.

9. A data processing system according to claim 8 further comprising:
   a. A fifth circuit which records in said level one cache memory location of data in response to a level one cache memory read miss and a level two cache memory read miss.

10. A data processing system according to claim 9 further comprising:
    a. A sixth circuit which detects parity errors of said level two cache memory and invalidates said corresponding portion which is less than all of said level one cache memory in response to said detected parity error.

11. A method of maintaining validity of data within a semi-store-in level one cache memory of a processor located within a system controller containing a duplicate tag memory and responsively coupled to a level two cache memory which is dedicated to said processor, which is located within said system controller having a tag memory, and which is responsively coupled to a system memory bus comprising:
    a. Formulating a write memory request within said processor;
    b. First checking for a level one cache memory hit in response to said write memory request;
    c. Second checking for a level two cache memory hit in response to a hit found by said first checking step; and
    d. Invalidating a portion of said level one cache memory corresponding to said write memory request in response to a hit found by said second checking step as indicated by said duplicate tag memory.

12. A method according to claim 11 further comprising:
    a. Inhibiting said invalidating step if said write memory request is mode 3 lacking ownership identification by said duplicate tag memory.

13. A method according to claim 12 further comprising:
    a. SNOOPing said system memory bus; and
    b. Invalidating said portion of said level one cache memory if said SNOOPing step identifies data corresponding to said write memory request.

14. A method according to claim 13 further comprising:
    a. Formulating a read memory request;
    b. experiencing a level one cache memory read miss; and
    c. recording location of data corresponding to said read memory request in said level one cache memory.

15. A method according to claim 14 further comprising:
    a. Determining whether a reference to said level two cache memory has caused a parity error; and
    b. Invalidate said portion which is less than all of said level one cache memory in response to said determining said parity error.

16. An apparatus comprising:
    a. executing means for executing program instructions;
    b. level one semi-store-in caching means located within a system controller and responsively coupled to said executing means for level one caching data;
    c. accessing means responsively coupled to said executing means and said level one semi-store-in caching means for accessing a data element from said level one semi-store-in means if said executing means requires accessing of said data element;
    d. level two caching means located within said system controller and responsively coupled to said requesting means for level two caching data and dedicated to said executing means; and
    e. first invalidating means responsively coupled to said level one semi-store-in caching means for invalidating said data element within said semi-store-in caching means if said data element is a write data element located within said level two caching means and within said semi-store-in level one caching means.

17. An apparatus according to claim 16 further comprising:
    a. inhibiting means responsively coupled to said first invalidating means for inhibiting said invalidating if said data element is mode 3 without ownership within said semi-store-in caching means.

18. An apparatus according to claim 17 further comprising:
    a. bussing means responsively coupled to said level two caching means for bussing system memory data;
    b. SNOOPing means responsively coupled to said bussing means for SNOOPing said bussing means; and
    c. second invalidating means responsively coupled to said SNOOPing means for invalidating said data element if said SNOOPing means locates a corresponding data element and said data element is a write data element.

19. An apparatus according to claim 18 further comprising:
    a. retrieving means responsively coupled to said level two caching means for retrieving a location of said data element if said data element is a read data element and said level two caching means experiences a miss.

20. An apparatus according to claim 19 further comprising:
    a. detecting means responsively coupled to said level two caching means for detecting a parity error; and
    b. third invaliding means responsively coupled to said level one semi-store-in caching means and said detecting means for invalidating said data element within said level one semi-store-in caching means if said detecting means detects said parity error.

* * * * *